C. H. BROWN.
TIME INDICATOR.
APPLICATION FILED MAR. 19, 1914.

1,128,751.

Patented Feb. 16, 1915.
2 SHEETS—SHEET 1.

Witnesses
E. R. Barrett
C. Maletice

Inventor
Clair H. Brown
By J. S. Thomas
Attorney

C. H. BROWN.
TIME INDICATOR.
APPLICATION FILED MAR. 19, 1914.
1,128,751. Patented Feb. 16, 1915.
2 SHEETS—SHEET 2.
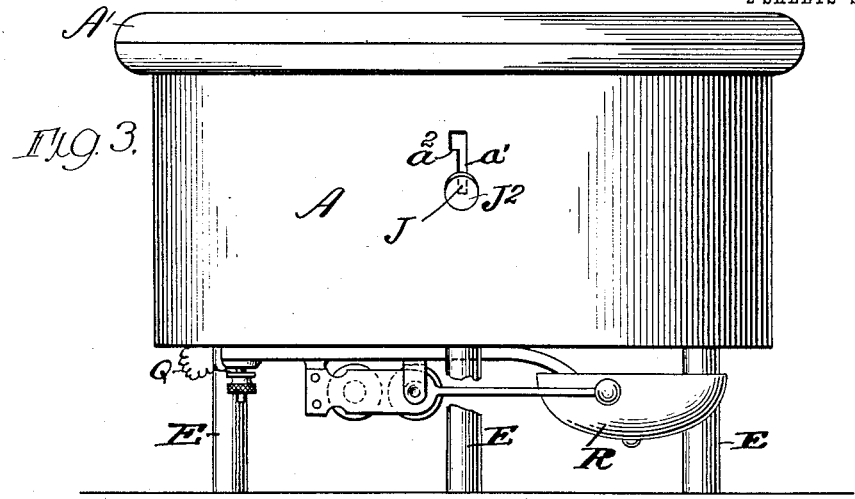
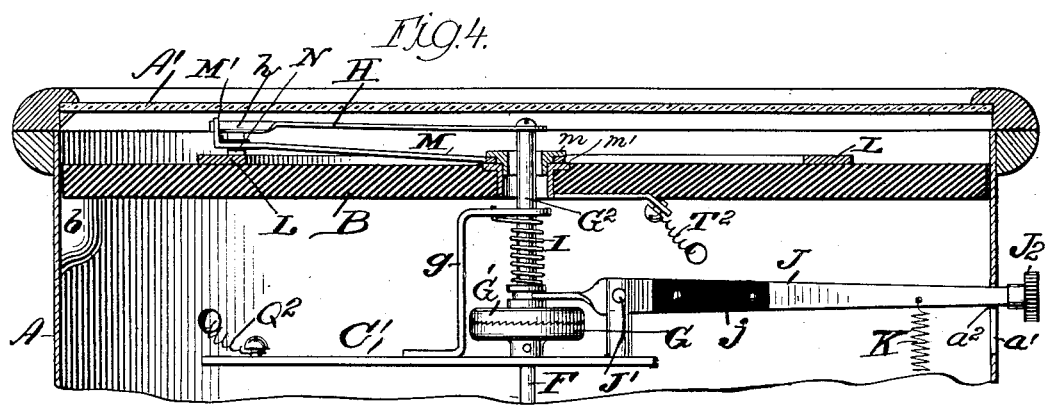
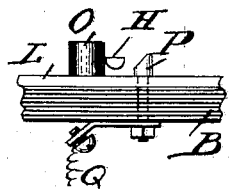
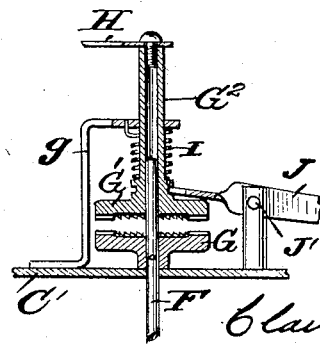
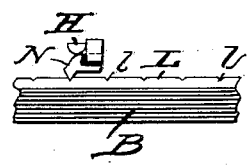

UNITED STATES PATENT OFFICE.

CLAIR H. BROWN, OF DETROIT, MICHIGAN.

TIME-INDICATOR.

1,128,751.　　　　Specification of Letters Patent.　　Patented Feb. 16, 1915.

Application filed March 19, 1914. Serial No. 825,736.

*To all whom it may concern:*

Be it known that I, CLAIR H. BROWN, citizen of the United States, residing at Detroit, county of Wayne, State of Michigan, have invented a certain new and useful Improvement in Time-Indicators, and declare the following to be a full, clear, and exact description of the same, such as will enable others skilled in the art to which it pertains to make and use the same, reference being had to the accompanying drawings, which form a part of this specification.

My invention relates to an improvement in time indicators and one of its objects is to issue a warning signal at the commencement and at the close of a predetermined period of time to the workman in charge of an operation requiring a certain interval of time for its successful accomplishment, as for instance the tempering of metals;—the development of photographic plates, etc.,—that he may know when the operation is completed.

Another object of the invention is to provide means for automatically returning the indicating means to its initial position ready for the next operation immediately after the completion of the operation.

Other advantages and improvements will hereafter appear.

Figure 1:
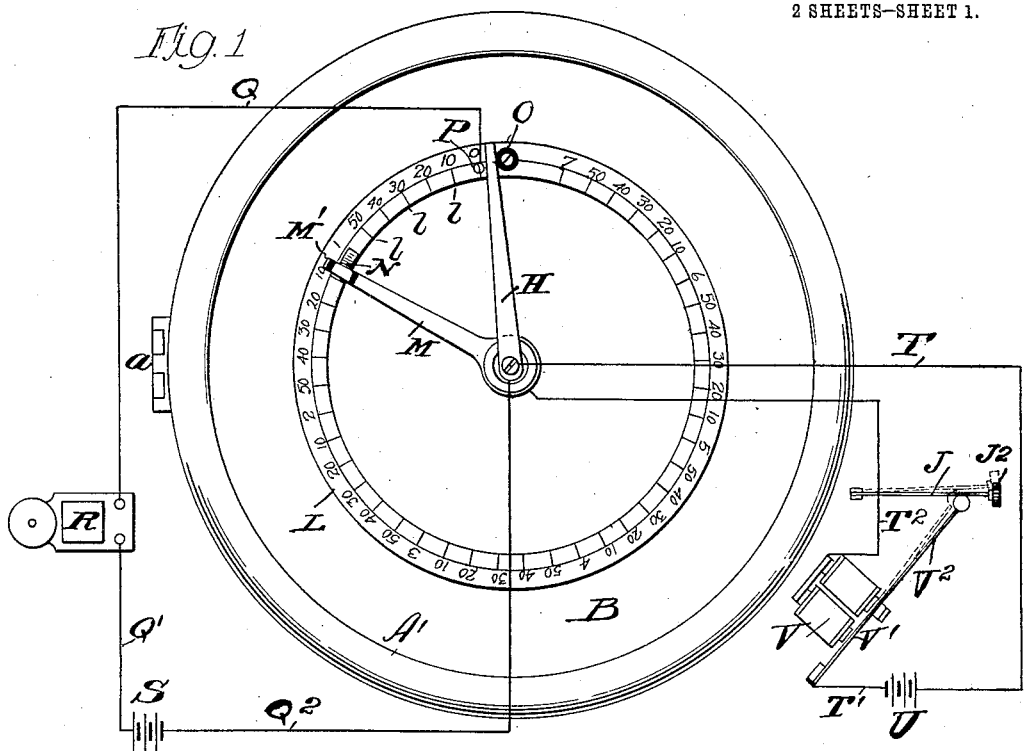
Figure 2:
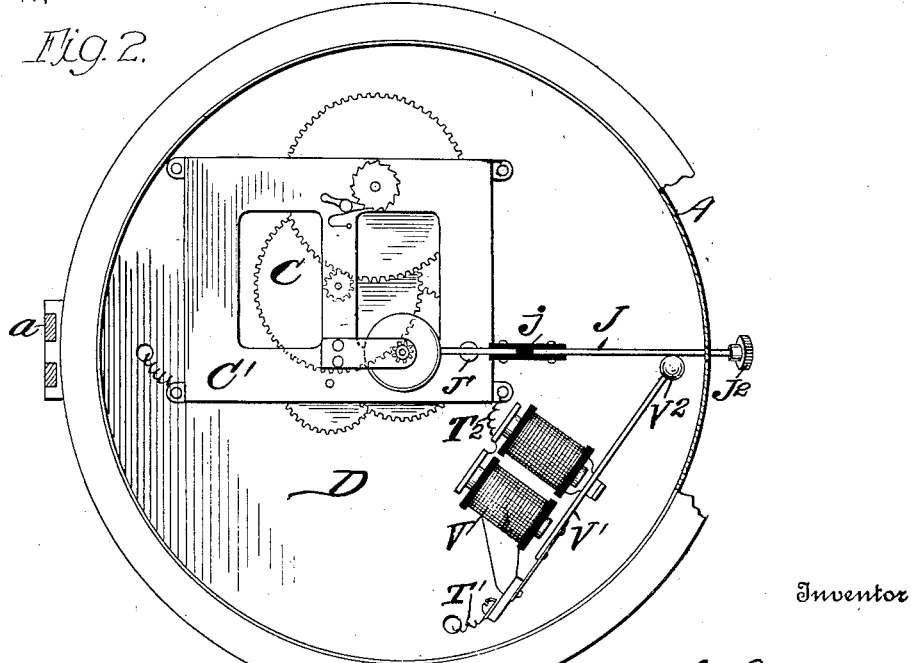

In the drawings accompanying this specification:—Figure 1 is a front elevation of the indicator showing diagrammatically the two electrical circuits employed with their respective connections. Fig. 2 is a front elevation of the indicator with the dial plate removed and with parts broken away and in section. Fig. 3 is a side elevation of the indicator with one of the supporting legs broken away that the construction may be more clearly indicated. Fig. 4 is a cross sectional view through the indicator with parts broken away, showing the clutch members engaged. Fig. 5 is a fragmental vertical cross sectional view showing the clutch members disengaged. Fig. 6 is a fragmentary detail showing the indicator hand at the "starting" post just before it closes the circuit through the starting terminal, to indicate the commencement of the operation. Fig. 7 is a fragmentary detail showing the indicator hand in contact with a detent carried by the setting lever (but insulated therefrom) to close the circuit through the signal bell to indicate the completion of the operation,—the indicator being also in contact with the upturned end of the setting lever to close the circuit through a device adapted to release the indicator hand, whereby it may be returned to its normal position.

Referring now to the letters of reference placed upon the drawings:—A denotes an inclosing frame or case, A′ a glass door hinged at $a$ to the side of the case.

B is a front wall preferably formed of insulating material secured to suitable lugs $b$ carried by the frame or case.

C denotes a suitable clock mechanism supported in a frame C′ in turn attached to a wall D at the back of the case.

E are legs projecting from the annular wall of the case by means of which the device may be secured to a wall or other support.

F is a shaft which may be geared so that it can be driven by the clock mechanism at any desired speed.

G indicates one half of a ratchet faced clutch member pinned to the shaft to rotate therewith.

G′ denotes the coacting portion of the clutch sleeved upon the shaft F and adapted to slide thereon that it may be engaged with the portion G, to rotate with the shaft or released therefrom as required. The portion G′ is provided with a relatively long sleeve or tubular shaft $G^2$ which projects through an opening in the front wall of the case and is there fitted with a swinging arm H, having an inwardly bent portion $h$ which serves as an electrical contact point.

I is a spring coiled around the shaft $G^2$ one end of which is secured to the bracket arm $g$ attached to the frame of the clock mechanism, the other end being engaged to the hub of the clutch member G′.

J indicates a lever fulcrumed at J′, in a post carried by the frame C′, and insulated at $j$ from the case. One end of the lever J is forked that it may lodge within the peripheral groove of the hub of the clutch member G′,—the other end of the lever projecting through a slot $a'$, in the wall of the case and fitted with a knob $J^2$, to facilitate the manual setting of the lever upon the shoulder $a^2$ in the wall of the slot.

K is a spring one end of which is engaged to the lever and the other to some convenient part of the frame, the purpose of which is to hold the clutch members out of engagement when the lever is released from the supporting shoulder $a^2$, as will be hereafter explained.

L is an annular graduated ring secured to the wall B, the graduations $l$ indicating periods of ten seconds each in the embodiment shown. It will be obvious however that it may be graduated to indicate other periods of time if desired.

M is an adjustable arm—having an upturned end M',—pivoted between the annular collars $m$ and $m'$ carried by the wall B, the collars being concentric to the shaft $G^2$, but spaced therefrom.

N is a detent carried by the arm M, but insulated therefrom, adapted to enter the grooves forming the graduations $l$ on the ring L to secure the arm M against accidental displacement.

O indicates a starting post insulated from the ring L, and designates the initial position of the swinging arm H.

P is an electrical terminal adjacent to the post O over which the contact portion $h$ of the swinging arm H rides to close the circuit Q leading to the bell R.

Q' is a connection between the bell and a battery S, and $Q^2$ is a connection from the battery to the swinging arm H, completing the circuit through the arm H back to the starting point.

T is a connection leading from the swinging arm H to the battery U; T' is a connection from the battery U to a magnet V, and $T^2$ a connection from the magnet back to the adjustable arm M. To the armature V' of the magnet V, is secured a hammer $V^2$, adapted to strike the lever J upon the magnet being energized, to dislodge the lever from its elevated position upon the shoulder $a^2$ in the slot $a'$, thereby disengaging the clutch member G' from its coacting member G, through the coaction of the spring K.

Having indicated the several parts by reference letters the construction and operation of the apparatus will be readily understood.

For purposes of illustration it will be assumed that the attendant is engaged on an operation requiring one minute to perform from start to finish to secure the best results. He therefore rotates the adjustable arm M until its detent N enters the groove indicating the sixty second or one minute period—see Fig. 1—the arm J is then raised in the slot $a'$ and seated upon the shoulder $a^3$, which action forces the clutch member G' into locked relation with the member G pinned to the shaft F the latter being driven by the clock mechanism. The arm H then begins to rotate and upon contacting with the terminal stud P closes an electrical circuit—see diagrammatic portion of Fig. 1— by way of conductor Q to the bell R thence by Q' to battery S, thence by $Q^2$ to swinging arm H, and by way of the arm to terminal P or the place of beginning, thereby ringing the bell as a signal to commence the operation. Upon the swinging arm passing the terminal stud P the circuit is again broken, remaining open until the arm contacts with the detent N, carried by, but insulated from the adjustable arm M. The circuit is then closed through the detent N, by way of the annular ring L, through the terminal P, through Q, to the bell R, thence by Q' to battery S, thence by $Q^2$, to swinging arm H, and thence back to detent N or the place of beginning, ringing the bell R and thus indicating the end of the period required for the operation. The swinging arm still driven by the clock mechanism then contacts with the upturned end M' of the adjustable arm M, closing an electrical circuit through the conductor T, to the battery U, thence to the magnet V, by conductor $T^2$ to the arm M to the place of beginning, thereby energizing the magnet V causing the armature V' and with it the hammer $V^2$ to vibrate, which upon striking the lever J forces it from the supporting shoulder $a^2$. The spring K becoming active, draws down the lever J lifting the clutch member G' out of locking engagement with its coacting member and thereby arrests the further rotation of the swinging arm H. Upon the clutch being released the spring I serves to return the swinging arm H back to its initial position against the starting post O, ready for the next operation.

Having thus described my invention, what I claim is:—

1. In an apparatus of the character described, a clock mechanism, a stationary terminal for an electrical circuit, a signal bell, a battery, an adjustable electric terminal, a rotatable arm actuated by the clock mechanism adapted to close and open an electric circuit at both the fixed and adjustable terminals, whereby the bell may be sounded to indicate the beginning and the termination of an operation.

2. In an apparatus of the character described, a clock mechanism, a fixed electric terminal, a signal bell, a battery, a manually adjustable terminal adapted to be spaced from the fixed terminal to a greater or less degree, a rotating hand actuated by the clock mechanism adapted to close an electrical circuit upon passing the fixed terminal and the adjustable terminal, to sound the bell, and means for returning the hand to its initial position.

3. In an apparatus of the character described, a clock mechanism, a fixed terminal, an annular ring graduated to denote intervals of time, a manually adjustable terminal designed to traverse the annular ring adapted to be set at any of the several graduations, a signal bell, a battery, a rotatable hand actuated by the clock mechanism adapted to close an electrical circuit to sound the bell upon passing the fixed and adjustable terminals, and means for returning the hand to its initial position.

4. In an apparatus of the character described, a clock mechanism; a fixed terminal, an annular ring having graduated indentations denoting intervals of time, a manually adjustable arm adapted to be shifted to register with one of the graduations of the annular ring, a rotatable hand actuated by the clock mechanism adapted to contact with the fixed terminal to close an electric circuit in passing; whereby an alarm bell may be sounded, and to again close a circuit upon contacting with the manually adjustable arm to sound the alarm bell a second time, suitable clutch mechanism whereby the rotating hand may be actuated by the clock mechanism or released from its driven relation, bell, means for energizing the bell, means for disengaging the clutch mechanism, and means for returning the hand to its initial position.

5. In an apparatus of the character described, a clock mechanism, a fixed electric terminal, a manually movable electric terminal, a rotatable hand actuated by the clock mechanism, adapted to contact with both the fixed and movable terminals to close an electric circuit, a clutch mechanism to connect the hand with the clock mechanism, means for controlling the engagement and release of the clutch mechanism, an electric bell, a battery adapted to energize said bell upon the closing of the circuit by the rotatable hand through the fixed terminal and again upon reaching the movable terminal, and means for returning the hand to its initial position.

6. In an apparatus of the character described, a clock mechanism, a manually movable electric terminal, a rotatable hand actuated by the clock mechanism adapted to contact with the movable terminal to close an electric circuit, a clutch to connect the hand with the clock mechanism, a lever to control the engagement and release of the clutch members, means for supporting the lever to maintain the clutch members in locked relation, a magnet, an armature, a vibrating hammer carried by the armature adapted to release the lever from its means of support, a spring engaging the lever to withdraw the clutch members from their locked relation upon the release of the lever, and a battery to energize the magnet upon the closing of the circuit by the rotatable hand.

7. In an apparatus of the character described, a clock mechanism, a manually movable electric terminal, a rotatable hand actuated by the clock mechanism adapted to contact with the movable terminal to close an electric circuit, a clutch to connect the hand with the clock mechanism, a lever to control the engagement and release of the clutch members, means for supporting the lever to maintain the clutch members in locked relation, a magnet, an armature, a vibrating hammer carried by the armature adapted to release the lever from its means of support, a spring engaging the lever to withdraw the clutch members from their locked relation upon the release of the lever, a battery to energize the magnet upon the closing of the circuit by the rotatable hand, and means for returning the hand to its initial position.

8. In an apparatus of the character described, a clock mechanism, a fixed terminal, an annular ring having graduated indentations denoting intervals of time, an arm carrying a terminal insulated therefrom adapted to be manually shifted so as to register with one of the several graduations upon the annular ring, the signal bell, a battery, a rotatable hand actuated by the clock mechanism adapted to contact in passing with the fixed terminal and subsequently with the terminal carried by the arm to sound the bell, a clutch to connect the rotatable hand with the clock mechanism, a lever to control the engagement and release of the clutch, means for supporting the lever to maintain the clutch members in locked relation, a second electrical circuit adapted to be closed by the rotatable hand contacting with the manually operated arm, a magnet, an armature, a vibrating hammer carried by the armature adapted to release the lever from its supporting means, a spring engaging the lever to withdraw the clutch members from locked relation upon the release of the lever, a battery to energize the magnet, and means for returning the rotatable hand to its initial position.

9. In an apparatus of the character described, a clock mechanism, a rotatable hand actuated by the clock mechanism adapted to close an electric circuit in passing a pair of terminals spaced apart, a pair of terminals adapted for spaced adjustment with respect to each other, whereby a greater or less interval of time may elapse between the closing of an electric circuit by said rotatable hand due to its contact with each of said terminals in passing, a signal bell, and a battery to energize said bell upon the closing of the circuit by said rotatable hand.

10. In an apparatus of the character described, an electric circuit including a fixed terminal, an adjustable terminal and an alarm, a rotatable arm to cross the fixed terminal to sound said alarm and to engage said adjustable terminal to again sound said alarm.

11. In an apparatus of the character described, an electric circuit including a fixed terminal, an adjustable terminal and an alarm, a rotatable arm to cross the fixed terminal to sound said alarm and to engage said adjustable terminal to again sound said alarm, means for driving said rotatable arm, a controlling lever, a second electric circuit including a magnet which is energized when the rotatable arm engages said adjustable terminal and an armature adapted to engage said lever, and means operable immediately upon engagement of said controlling lever by said armature to return the lever to its normal position and stop said driving means.

12. In an apparatus of the character described, an electric circuit including a fixed terminal and an adjustable terminal, a rotatable arm to close and open the electric circuit at the fixed and adjustable terminals, and means for sounding an alarm upon closing the electric circuit at each of said electric terminals.

13. In an apparatus of the character described, a casing having a slot provided with a shoulder, a rotatable shaft journaled in said casing, an arm carried by said shaft, an electric circuit including a fixed terminal and an adjustable terminal, means for rotating said shaft whereby said arm will cross over the fixed terminal to close the circuit as it passes over the fixed terminal and also adapted to engage the adjustable terminal to again close the circuit, a controlling lever to stop and start said driving means, said lever projecting through said slot and being positioned on said shoulder of the slot to effect operation of the driving means, and means for engaging said lever to dislodge it from said shoulder when said arm engages said adjustable terminal, and means for operating the lever to throw the driving means out of operation.

14. In an apparatus of the character described, an electric circuit including a fixed terminal and an adjustable terminal, the adjustable terminal having a projection, a detent carried by the adjustable terminal, a rotatable arm adapted to cross the fixed terminal to close the circuit, the circuit being opened upon said arm leaving the fixed terminal, said arm adapted to subsequently engage said detent and again close said circuit.

15. In an apparatus of the character described, an electric circuit including a fixed terminal and an adjustable terminal, the adjustable terminal having a projection, a detent carried by the adjustable terminal, a rotatable arm adapted to cross the fixed terminal to close the circuit, the circuit being opened upon said arm leaving the fixed terminal, said arm adapted to subsequently engage said detent and again close said circuit, means for driving said rotatable arm, a controlling lever adapted to throw the driving means into and out of operation, a second electric circuit including a magnet and an armature adapted to engage said lever so as to release the lever from operative connection with the driving means.

16. In an apparatus of the character described, an electric circuit including a fixed terminal and an adjustable terminal, the adjustable terminal having a projection, a detent carried by the adjustable terminal, a rotatable arm adapted to cross the fixed terminal to close the circuit, the circuit being opened upon said arm leaving the fixed terminal, said arm adapted to subsequently engage said detent and again close said circuit, means for driving said rotatable arm, a controlling lever adapted to throw the driving means into and out of operation, a second electric circuit including a magnet and an armature adapted to release the controlling lever for operative connection with the driving means, and an alarm arranged in the first mentioned circuit operable upon closing the circuit at the fixed and adjustable terminals.

In testimony whereof, I sign this specification in the presence of two witnesses.

CLAIR H. BROWN.

Witnesses:
SAMUEL E. THOMAS,
CHRISTINE MALETIN.